United States Patent
Li et al.

(10) Patent No.: US 8,559,899 B2
(45) Date of Patent: Oct. 15, 2013

(54) METHOD OF IMPROVING TRANSMISSION GAIN AT A NETWORK ELEMENT HAVING A PLURALITY OF ANTENNAS

(75) Inventors: Li Li, Edison, NJ (US); Thomas Marzetta, Summit, NJ (US); Hong Yang, Ledgewood, NJ (US)

(73) Assignee: Alcatel Lucent, Paris (FR)

( * ) Notice: Subject to any disclaimer, the term of this patent is extended or adjusted under 35 U.S.C. 154(b) by 197 days.

(21) Appl. No.: 13/236,082

(22) Filed: Sep. 19, 2011

(65) Prior Publication Data

US 2013/0072140 A1 Mar. 21, 2013

(51) Int. Cl.
*H01Q 11/12* (2006.01)
(52) U.S. Cl.
USPC ............ 455/127.2; 455/126; 455/67.11; 455/562.1
(58) Field of Classification Search
USPC .......... 455/127.2, 127.1, 63.1, 63.4, 67.11, 455/423, 129, 126, 562.1, 69, 276.1, 522; 370/312, 328
See application file for complete search history.

(56) References Cited

U.S. PATENT DOCUMENTS

| | | | | |
|---|---|---|---|---|
| 4,829,310 | A * | 5/1989 | Losee | 343/719 |
| 5,898,908 | A * | 4/1999 | Griffin et al. | 455/127.2 |
| 6,891,897 | B1 * | 5/2005 | Bevan et al. | 375/265 |
| 2008/0182532 | A1 * | 7/2008 | Kobayashi et al. | 455/127.2 |
| 2010/0014463 | A1 * | 1/2010 | Nagai et al. | 370/328 |

FOREIGN PATENT DOCUMENTS

WO WO-0215326 A2 2/2002

OTHER PUBLICATIONS

Florian Kaltenberger et al., "Relative Channel Reciprocity Calibration in MIMO/TDD Systems", Future Network and MobileSummit 2010 Conference Proceedings, IIMC International Information Management Corporation, 2010, pp. 1-10.
Maxime Guillaud et al., "A Practical Method for Wireless Channel Reciprocity Exploitation Through Relative Calibration", 2005 IEEE, pp. 403-406.
Olivier Besson et al., "Decoupled Estimation of DOA and Angular Spread for a Spatially Distributed Source", IEEE, vol. 48, No. 7, Jul. 2000, pp. 1872-1882.
Ehsan Aryafar, Narendra Anand et al., "Design and Experimental Evaluation of Multi-User Beamforming in Wireless LANs", *MobiCom'10*, Sep. 20-24, 2010.
Andre Bourdoux et al., "Non-reciprocal Transceivers in OFDM/SDMA Systems: Impact and Mitigation", 2003 IEEE, pp. 183-186.
Dale Branlund et al., "AAS Direct Signaling Methodologies to Support High Capacity MMR-BX to RS Links", IEEE 802.16 Broadband Wireless Access Working Group, pp. 1-14.
International Search Report dated Dec. 10, 2012 for International Application No. PCT/US2012/055744.

* cited by examiner

*Primary Examiner* — John J Lee
(74) *Attorney, Agent, or Firm* — Harness, Dickey & Pierce

(57) ABSTRACT

In one embodiment, the method includes reducing a beam width of transmission to increase an open-loop beamforming gain, reducing a channel bandwidth of the transmission to increase a channel bandwidth gain, and increasing a sequence length of the transmission to increase a sequence length gain. In this embodiment, a gain improvement is based on the product of the open loop beamforming gain, the channel bandwidth gain and the sequence length gain.

15 Claims, 3 Drawing Sheets

METHOD OF IMPROVING TRANSMISSION GAIN AT A NETWORK ELEMENT HAVING A PLURALITY OF ANTENNAS

BACKGROUND OF THE INVENTION

In wireless communication systems, base stations are traditionally equipped with a small number of antennas. A radically different approach involves base stations with an unprecedented numbers of antennas (M) simultaneously serving a much smaller number of mobile terminals (K where M>>K) using multi-user beamforming. Operating with a large ratio of antennas to terminals under simultaneous service can yield large increases in both spectral efficiency and energy efficiency. As the number of service antennas increases and power is reduced the most simple signal processing, conjugate beamforming on the forward link and matched-filtering on the reverse link, asymptotically achieves near-optimal performance.

SUMMARY OF THE INVENTION

By using a large number of antennas, a large antenna array (LSAS) base station should be able to reduce the transmit power per antenna to a few Watts or even lower. Therefore, a LSAS base station antenna no longer needs the power amplifier of very high power consumption or the concomitant expensive cooling equipment. However, cellular networks also have broadcast operations. For example, timing synchronization (also known as cell search) and paging typically require broadcast operation.

Since the base station has no knowledge of the channels of unknown terminals before those terminals become active, the base station can not make use of close-loop beamforming to improve gain (for close-loop beamforming, the antenna array uses knowledge of the channels to the terminals to selectively focus power on the forward link, and to selectively collect power on the reverse link). To deal with this problem, one or more embodiments use a combination of techniques: open-loop beamforming (e.g., reducing beam width), reducing channel bandwidth, and increasing a sequence length (e.g., increasing a synchronization sequence length for cell search or increasing redundancy of repetition coding for paging).

Accordingly, at least one embodiment relates to a method of improving transmission gain at a network element having a plurality of antennas.

In one embodiment, the method includes reducing a beam width of transmission to increase an open-loop beamforming gain, reducing a channel bandwidth of the transmission to increase a channel bandwidth gain, and increasing a sequence length of the transmission to increase a sequence length gain. In this embodiment, a gain improvement is based on the product of the open loop beamforming gain, the channel bandwidth gain and the sequence length gain.

In one embodiment, the reducing a beam width reduces the beam width to a minimum beam width of the network element.

In another embodiment, the reducing a beam width reduces the beam width below an angular spread associated with the network element.

In a further embodiment, the reducing a beam width reduces the beam width by a fixed amount.

In one embodiment, the reducing a channel bandwidth reduces the channel bandwidth to one sub-carrier.

In another embodiment, the reducing a channel bandwidth reduces the channel bandwidth by one sub-carrier.

In a further embodiment, the reducing a channel bandwidth reduces the channel bandwidth by a fixed amount.

In one embodiment, the increasing increases the length of a synchronization sequence for cell search.

In another embodiment, the increasing increases a redundancy of repetition coding for paging.

In one embodiment, the reducing a channel bandwidth reduces the channel bandwidth and the increasing increases the sequence length such that the channel bandwidth gain times the sequence length gain is less than $$\frac{1}{\tau N},$$

where N is the maximum number of messages sent per second on a broadcast channel and $\tau$ is the duration of each message.

In one embodiment, the method further includes beamforming using the reduced beam width. In one embodiment, the method may further include rotating beams, and beamforming using the reduced beam width. For example, the rotating rotates the beams by one-half of the reduced beam width.

In another embodiment, the method includes determining a desired gain improvement, and the reducing a beam width, the reducing a channel bandwidth and the increasing steps are performed to obtain the desired gain improvement. For example, in one embodiment, the reducing a beam width reduces the beam width by a first fixed amount, the reducing a channel bandwidth reduces the channel bandwidth by a second fixed amount, the increasing increases the synchronization length for cell search or redundancy of repetition coding for paging by a third fixed amount, and the reducing a beam width, the reducing a channel bandwidth and the increasing steps are repeated until the desired gain improvement is obtained.

BRIEF DESCRIPTION OF THE DRAWINGS

The present invention will become more fully understood from the detailed description given herein below and the accompanying drawings, wherein like elements are represented by like reference numerals, which are given by way of illustration only, and thus, are not limiting of the present invention and wherein.

DETAILED DESCRIPTION OF THE EMBODIMENTS

Figure 1:
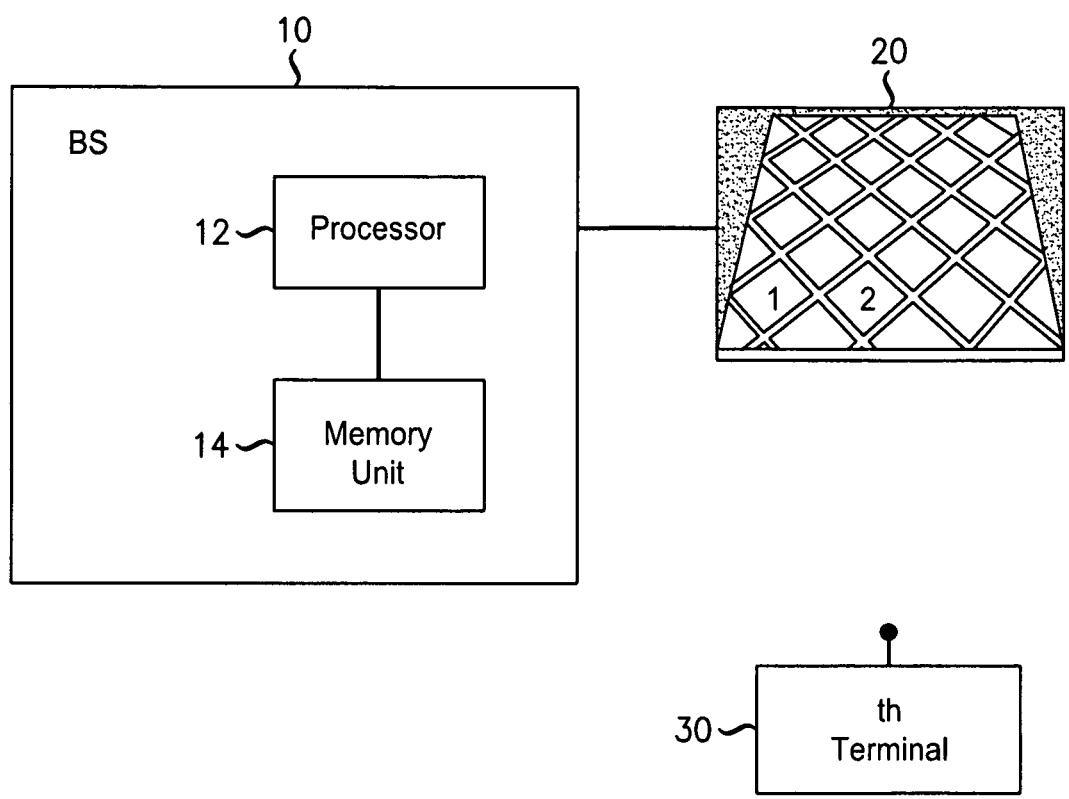
FIG. 1 illustrates a portion of a wireless communication system according to an embodiment.

Various example embodiments will now be described more fully with reference to the accompanying drawings in which some example embodiments are shown.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a controller. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Note also that the software implemented aspects of example embodiments are typically encoded on some form of tangible (or recording) storage medium or implemented over some type of transmission medium. As disclosed herein, the term "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "terminal" may be synonymous to a mobile user, mobile station, mobile terminal, user, subscriber, wireless terminal, user equipment and/or remote station and may describe a remote user of wireless resources in a wireless communication network. Accordingly, terminal may be a wireless phone, wireless equipped laptop, wireless equipped appliance, etc.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may generally be applicable to architectures where that distinction is not so clear, such as ad hoc and/or mesh network architectures, for example.

Communication from the base station to the terminal is typically called downlink or forward link communication. Communication from the terminal to the base station is typically called uplink or reverse link communication.

Architecture

FIG. 1 illustrates a portion of a wireless communication system according to an embodiment. As shown, a base station 10 has a large antenna array 20 of M antennas. For example, M may be 100 antennas, but is not limited to this number. The base station 10 also includes a processor 12 (e.g., a digital signal processor), and a memory unit 14. The memory unit 14 may be any well-known storage medium or combination thereof. The processor 12 controls operation and function of the base station 10, and stores data, etc. in the memory unit 14. The operation of the base station 10 will be described in greater detail below. FIG. 1 also illustrates a terminal 30 in the coverage area of the base station 10. As will be appreciated, numerous terminals may be within the coverage area of the base station 10.

By using a large number of antennas, a large antenna array (LSAS) base station should be able to reduce the transmit power per antenna to a few Watts or even lower. Therefore, a LSAS base station antenna no longer needs the power amplifier of very high power consumption or the concomitant expensive cooling equipment. However, cellular networks also have broadcast operations. For example, timing synchronization (also known as cell search) and paging typically require broadcast operation.

Since the base station has no knowledge of the channels of unknown terminals before those terminals become active, the base station can not make use of close-loop beamforming to improve gain. To deal with this problem, one or more embodiments use a combination of techniques: open-loop beamforming, reducing channel bandwidth, and increasing a sequence length (e.g., increasing a synchronization sequence length for cell search or increasing redundancy of repetition coding for paging).

Operation

Figure 2:
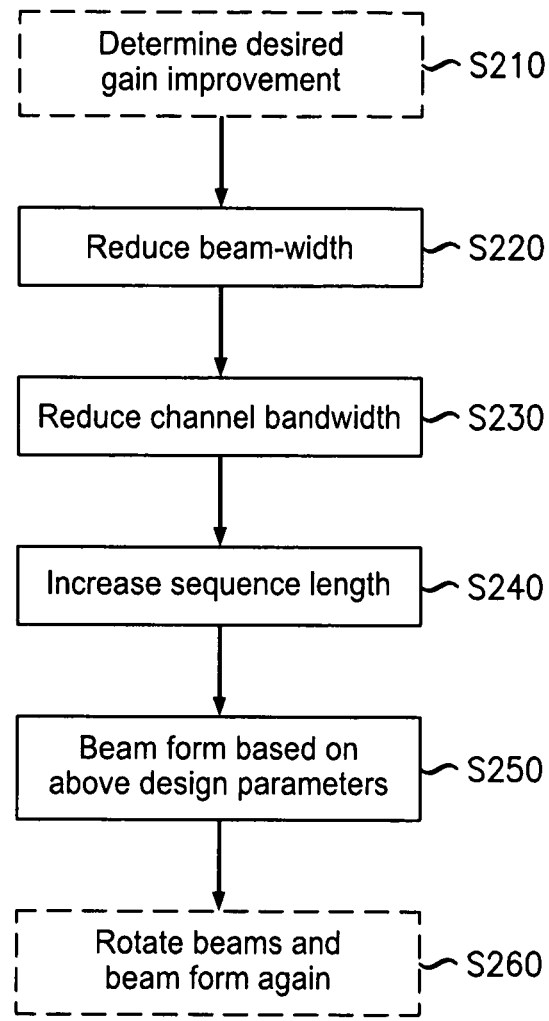
FIG. 2 illustrates a method of improving transmission gain according to an embodiment.

FIG. 2 illustrates a method of improving transmission gain according to an embodiment. As shown, in step S210, a system designer may determine a desired gain improvement. As indicated by the dashed box in FIG. 2 for this step, determining a desired gain improvement may be optional. In step S210, suppose each base station antenna's maximum transmission power is P1. Suppose a traditional base station transmits with a maximum transmission power P0. Let $g_{tt}$ be the total desired gain improvement for the LSAS base station as compared with a traditional base station. Here, $$g_{tt} = \frac{P_0}{P_1}.$$

For example, if a traditional base station has a transmission power of 20 Watt and a LSAS base station antenna only needs 2 Watts power, then $g_{tt}$=10.

Next, in step S220, the system designer configures the base station 10 to reduce the beam width to improve the open-loop beamforming gain $g_o$ over that of a single antenna. The beamforming gain, however, is limited by the angular spread $\Theta_{angs}$ of the deployment environment. The angular spread $\Theta_{angs}$ may be determined according to any well-known technique. We define effective beam-width $\Theta_{eff}$ to be the actual beam-width $\Theta_{beam}$ plus angular spread $\Theta_{angs}$. Thus, the beamforming gain $g_o$ may be expressed as $$g_O = \frac{360^0}{\Theta_{eff}} \quad (1)$$

For example, if the angular spread is 60° and the beam-width is set to 30°. Then $g_o$=360/(30+60)=4. In one embodiment, the actual beam-width is reduced below the angular spread. In another embodiment, such as in this example, the actual beam-width is set to one-half the angular spread. Furthermore, the actual beam-width is maintained above a minimum design constraint of the system. In operation, the base station will beamform to m=360/$\Theta_{beam}$ directions.

Next, in step S230, the channel bandwidth is reduced to increase a channel bandwidth gain $g_b$. As will be appreciated, there are a finite number of modulation schemes. For each modulation scheme, there is a threshold on received SNR, below which decoding is not possible. With fixed total power, smaller bandwidth implies larger received signal-to-noise ratio SNR. In establishing use of channel bandwidth resources, for example in an orthogonal frequency division multiplexing OFDM based system, the base station 10 assigns one or more sub-carriers. Accordingly, in one embodiment, the minimum bandwidth is one sub-carrier, and the system designer may reduce the channel bandwidth in step S230 to one sub-carrier.

Next, in step S240, a sequence length is increased to increase a sequence length gain $g_s$. For example, in step S240, a synchronization sequence length for cell search may be increased, and/or a redundancy of repetition coding for paging may be increased. Assuming an initial or convention synchronization sequence length L0, and the new, longer sequence length L1, then gs=L1/L0. This gain $g_s$ can be applied to the synchronization channel for cell search, and the paging channel on which per-subscriber information is sent. For application to the paging channel, repetition coding may be used.

If the system imposes a capacity on the broadcast channel where N is the maximum number of messages (average length) sent per second on the broadcast channel and τ is the duration of each message for a traditional base station, then a limit on $g_s$ and $g_b$ is shown below in expression (2):

$$g_s \times g_b < \frac{1}{\tau N} \quad (2)$$

Next, in step S250, during operation, the base station 10 beamforms to m=360/$\Theta_{beam}$.

Figure 3:
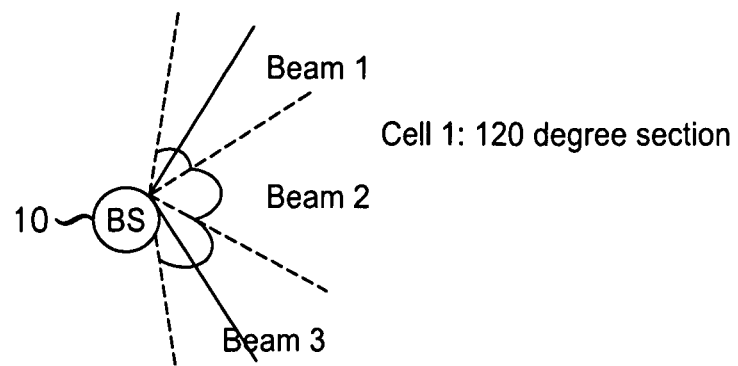
FIG. 3 shows an example of a cell section during beamforming.
Figure 4:
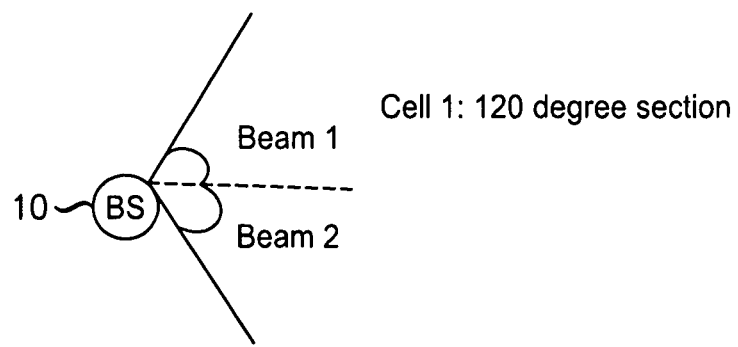
FIG. 4 shows an example of beamforming after rotation.

As a further option, to improve the gains between the boundaries of the beams, the base station 10 beamforms again by rotating the beam by $\Theta_{beam}/2$ as indicated in step S260. For example, suppose a cell is a 120 degree section as shown in FIG. 3. Suppose $\Theta_{beam}$=60 degrees. The base station 10 first beams at the three directions with beam width of $\Theta_{beam}$. To improve the beamforming gains between the boundaries of the beams, the base station 10 then rotates the beams by 30 degrees and beamforms to two directions (each beam width is 60 degrees) as shown in FIG. 4. Instead of creating beams of maximum angular spread, the beams may be tailored to the angular spread of each direction.

As one example alternative to the embodiment of FIG. 4, steps S220, S230 and S240 may each operate based on a fixed increment, and the steps repeated until the desired gain improvement is reached. For instance, step S220 may reduce the traditional or an initial beam width by 10 degrees, step S230 may reduce the traditional or an initial bandwidth by one sub-carrier, and step S240 may lengthen the traditional or initial sequence by 50% (or 100%) of the initial sequence length. Then, the total gain improvement TGI=$g_o \times g_b \times g_s$ is compared to the desired gain $g_{tt}$. If TGI is less than $g_{tt}$, then steps S220, S230 and S240 are repeated. If not, processing proceeds to step S250. Additionally, the comparison of TGI to $g_{tt}$ may be performed after each of steps S220, S230 and S240 with processing proceeding to the next of step S220, S230 and S240 if TGI is less than $g_{tt}$, and processing proceeding to step S250 if TGI is not less than $g_{tt}$.

Still further, as described above, determining a desired gain improvement is optional, and the method may be performed to achieve gain improvement without having a target gain improvement. Additionally, the target or desired gain improvement may be set as a design parameter or based on empirical study.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

We claim:

1. A method of improving transmission gain at a network element having a plurality of antennas, comprising:
    reducing a beam width of transmission to increase an open-loop beamforming gain;
    reducing a channel bandwidth of the transmission to increase a channel bandwidth gain; and
    increasing a sequence length of the transmission to increase a sequence length gain; wherein
    a gain improvement is based on the product of the open loop beamforming gain, the channel bandwidth gain and the sequence length gain.

2. The method of claim 1, wherein the reducing a beam width reduces the beam width to a minimum beam width of the network element.

3. The method of claim 1, wherein the reducing a beam width reduces the beam width below an angular spread associated with the network element.

4. The method of claim 1, wherein the reducing a beam width reduces the beam width by a fixed amount.

5. The method of claim 1, wherein the reducing a channel bandwidth reduces the channel bandwidth to one sub-carrier.

6. The method of claim 1, wherein the reducing a channel bandwidth reduces the channel bandwidth by one sub-carrier.

7. The method of claim 1, wherein the reducing a channel bandwidth reduces the channel bandwidth by a fixed amount.

8. The method of claim 1, wherein the increasing increases the length of a synchronization sequence for cell search.

9. The method of claim 1, wherein the increasing increases redundancy of repetition coding for paging.

10. The method of claim 1, wherein the increasing and the reducing a channel bandwidth are performed such that the channel bandwidth gain times the sequence length gain is less than $$\frac{1}{\tau N},$$

where N is the maximum number of messages sent per second on a broadcast channel and $\tau$ is the duration of each message.

11. The method of claim 1, further comprising:
    beamforming using the reduced beam width.

12. The method of claim 1, further comprising:
    rotating beams; and
    beamforming using the reduced beam width.

13. The method of claim 1, wherein the rotating rotates the beams by one-half of the reduced beam width.

14. The method of claim 1, further comprising:
    determining a desired gain improvement; and wherein
    the reducing a beam width, the reducing a channel bandwidth and the increasing steps are performed to obtain the desired gain improvement.

15. The method of claim 14, wherein
    the reducing a beam width reduces the beam width by a first fixed amount;
    the reducing a channel bandwidth reduces the channel bandwidth by a second fixed amount;
    the increasing increases the sequence length by a third fixed amount; and wherein
    the reducing a beam width, the reducing a channel bandwidth and the increasing steps are repeated until the desired gain improvement is obtained.

* * * * *